United States Patent [19]

Lessig, III

[11] 4,044,532

[45] Aug. 30, 1977

[54] TWO-MOTION SWITCH FOR CORDLESS LAWNMOWER

[75] Inventor: William Ralph Lessig, III, Towson, Md.

[73] Assignee: The Black and Decker Manufacturing Company, Towson, Md.

[21] Appl. No.: 607,635

[22] Filed: Aug. 25, 1975

[51] Int. Cl.² .............................................. A01D 75/20
[52] U.S. Cl. ..................................... 56/10.5; 200/157; 200/331
[58] Field of Search .................... 56/11.9, 10.5, 11.3, 56/16.7; 200/157, 330, 331, 332

[56] References Cited

U.S. PATENT DOCUMENTS

| | | | |
|---|---|---|---|
| 3,131,277 | 4/1964 | Brenzen | 200/157 |
| 3,212,244 | 10/1965 | Wilgus | 56/11.9 |
| 3,564,186 | 2/1971 | Mittelstadt et al. | 200/331 |
| 3,581,480 | 6/1971 | O'Connor et al. | 56/11.9 |
| 3,603,065 | 9/1971 | Weber | 56/16.7 |
| 3,849,620 | 11/1974 | Melisz | 200/157 |

Primary Examiner—Jay N. Eskovitz

Attorney, Agent, or Firm—Edward D. Murphy; Leonard Bloom

[57] ABSTRACT

A safety switch for a cordless electric device such as a lawnmower or other gardening tool. The device includes a cutting or working implement such as a rotating blade, an electric motor, a battery power supply and an electric switch for connecting the battery to the motor. To prevent accidental operation of the device, a switch control lever is provided which requires two separate and independent motions to be made before the switch can be activated. A switch enclosure is provided which receives the switch operating lever in a close fitting manner. Structure is provided for permitting movement of the operating lever to a position external of the housing; from this position, it can be grasped and moved to the switch-actuation position by a separate motion. The structure permitting movement of the lever may comprise, for example, an access opening in the housing which is separate from the opening in which the lever rests or it may comprise an independent lever-operating member.

12 Claims, 9 Drawing Figures

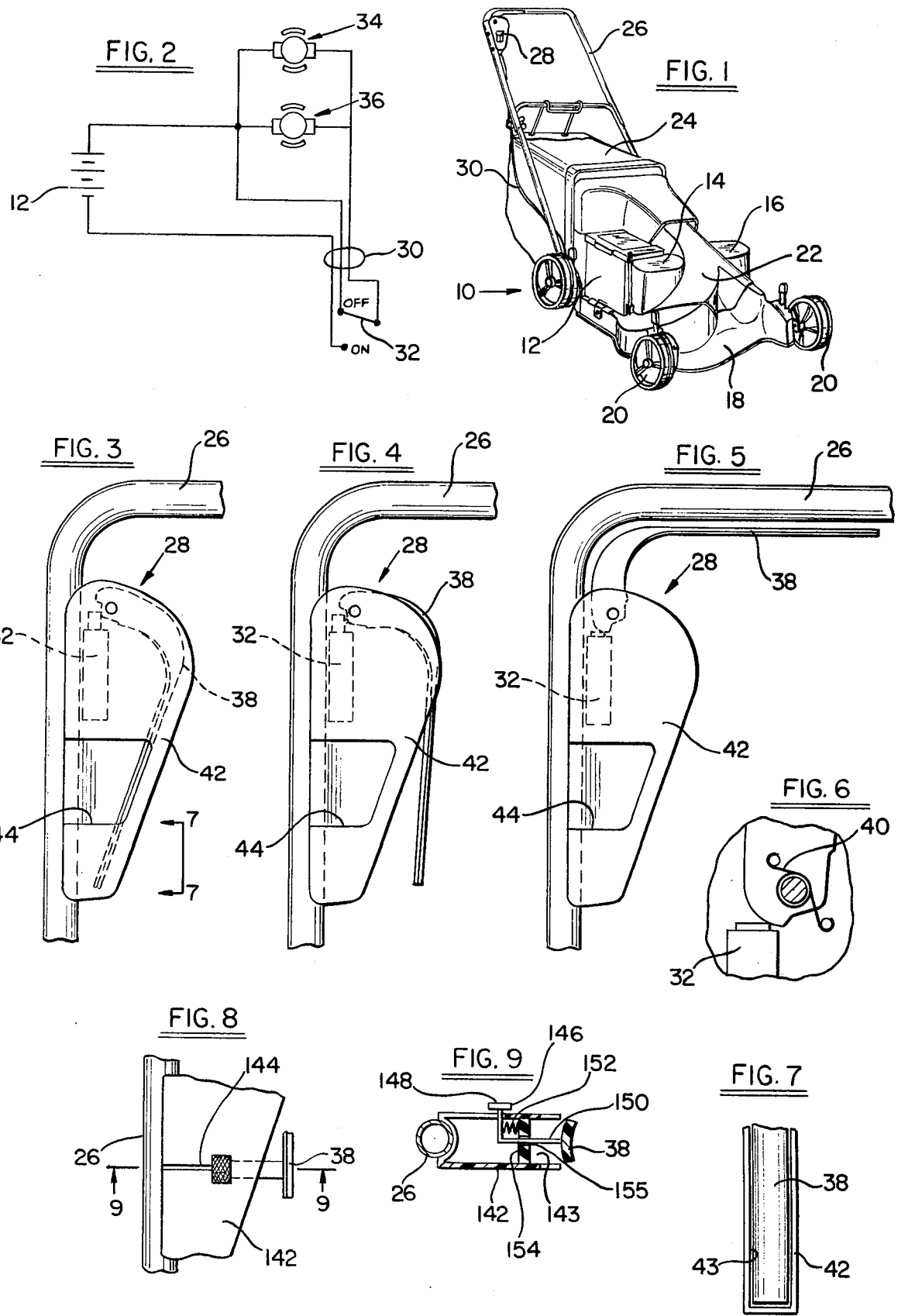

TWO-MOTION SWITCH FOR CORDLESS LAWNMOWER

The present invention is directed to an improved operating device for controlling a cordless tool, particularly a gardening tool such as a lawnmower, which might otherwise present a hazard to careless operators. Specifically, the present invention is directed to the provision of a switch operating mechanism which, from the off position, requires two physically distinct separate movements to move the lever into the switch-actuation position.

BACKGROUND

In the past, most cordless lawn and garden tools which include potentially hazardous working members such as rotating or reciprocating blades have included a variety of lock-off mechanisms which prevented the operator from moving the switch control lever directly from its off position to its on position. However, lock-off mechanisms generally require various parts in addition to the switch and its operating lever. Accordingly, such devices are excessively expensive and complex to manufacture. In addition, the lock-off mechanisms may break, they may be deliberately removed and thus defeated by the operator, or they may be excessively difficult to operate. In some cases, it has even been necessary to use two hands to initiate operation of the tool. It is a principal purpose of this invention to provide an improved switch operating mechanism which provides an adequate safeguard against accidental operation but which is not subject to these various difficulties.

SUMMARY

The present invention is directed to a switch operating mechanism for a cordless tool wherein a switch operating lever is provided for causing actuation of the switch between the battery and the tool motor. The switch itself is spring biased to an off position and the switch operating lever is also spring biased to a position wherein it is not accessible to the operator. In accord with this invention, the operator must perform a first movement which removes the lever from its inaccessible position and places it in an accessible position from whence it is moved, via a separate and physically distinct motion, to the switch-actuating position wherein it turns the switch on. In accord with a preferred embodiment of this invention, this may be accomplished by providing a closely fitting enclosure for the lever and by providing a separate aperture through which the operator may reach the lever to move it into an accessible position. In a second embodiment, an independent lever-actuating member may be provided to engage the lever in its inaccessible position and move it into an accessible position.

Particular objects and advantages of this invention will become apparent as the description and illustration thereof proceed.

In the FIGS:

FIG. 1 is a perspective view of a cordless electric lawnmower including a switch which incorporates a preferred embodiment of the present invention;

FIG. 2 is a schematic diagram illustrating the circuit used in the lawnmower of FIG. 1;

FIGS. 3, 4 and 5 are plan views of the switch mechanism of the lawnmower of FIG. 1 in different positions;

FIG. 6 is a detailed view of a portion of FIG. 5;

FIG. 7 is a side elevation of a portion of FIG. 3, looking from the position 7—7;

FIG. 8 is a detailed view similar to that of FIG. 4, but showing an alternative embodiment; and FIG. 9 is a cross sectional view taken along the lines 9—9 of FIG. 8.

In FIG. 1, a cordless electric lawnmower is illustrated generally at 10. The mower may include a battery 12 which is adapted for powering a pair of electric motors which are disposed within motor covers 14, 16 and which, in turn, drive a pair of counter-rotating cutting blades (not shown) located beneath the deck 18 and for cutting grass over which the lawnmower is moved on wheels 20. The grass clippings are blown through discharge passage 22 into a bag 24.

A handle 26 is provided in conventional manner and a switch mechanism 28 is mounted on the handle for controlling the connection of the battery 12 to the motors via cable 30. The circuit of the mower is illustrated in FIG. 2 wherein it can be seen that the battery 12 is connectable via cable 30 and a switch 32 to drive the armatures of motors 34 and 36. In the off position of the switch, the armatures are preferably shorted to provide braking action.

FIGS. 3, 4 and 5 illustrate in greater detail the switch mechanism 28. As can be seen therein, the switch mechanism includes the switch 32 and a switch operating lever 38 which is shaped and positioned so that it can be comfortably held against the handle 26 by the operator in the on position shown in FIG. 5. In order to prevent the possibility of accidental actuation by the operator when he may not intend it, and to reduce the possibility of actuation by an unauthorized person such as a child, the switch lever is spring biased, for example by torsion spring 40 shown in FIG. 6, to return to the position shown in FIG. 3 wherein it is entirely enclosed within a housing 42. In this position, as illustrated by the frontal view of FIG. 7, the lever 38 is received within a recess 43 defined by the tightly enclosing side walls of housing 42 and enters so far that an operator cannot directly engage the lever and move it in one continuous motion from the FIG. 3 position to the FIG. 5 position. To enable actuation of the lever, an opening 44 is provided in the upper side wall of the housing 42. The operator must insert his fingers into this opening and push the lever outwardly of the housing until it reaches approximately the position shown in FIG. 4. At this point, the remaining fingers of the same hand or the other hand may be used to engage the lever in the space between the lever 38 and housing 42 and pivot it to the position shown in FIG. 5, thus actuating the switch 32 and turning the mower on.

FIGS. 8 and 9 illustrate an alternative embodiment of this invention wherein the same switch lever 38 is enclosed within an alternative housing 142. The housing 142 includes a recess 143 similar to recess 43 and a substantially continuous upper surface having a slot 144 therein. Extending above the slot, there is a lever actuating member 146 having a finger-engageable knurled surface 148. The member 146 also includes an internal, laterally extending portion 150 which extends to and engages the internal surface of lever 38. Spring 152 is provided to bias the member 146 to the left in the figure. An internal wall 154 having a guiding aperture 155 is also provided to guide the movement of member 146.

The operation of this embodiment is substantially the same as that of the embodiment shown in FIGS. 3-5. The operator engages the surface 148 with one or more fingers of his right hand and moves the member 146 to the right as shown in the figure. As soon as the lever 38 appears externally of the housing 142, the remaining fingers of his right hand are inserted between the lever 38 and the housing 142 and the motion of the lever to the position shown in FIG. 5 is completed, thus causing actuation of the switch.

In each of the embodiments of this invention, the essential safety of this switch mechanism lies in the fact that a single continuous motion of the operator's hand cannot cause operation of the switch. If this were possible, a single continuous motion might cause accidental operation of the switch with consequent hazard to the operator or to other persons nearby. Similarly, a single continuous motion might accidentally be accomplished by a child with similar hazardous results. When two distinctive motions are required, it is unlikely that an accidental movement by the operator or the normal movements of a child will accomplish switch actuation. Once the device is turned off and the lever is released, it returns automatically to an inaccessible position and it is likely to remain there until the operator deliberately intends to turn the device on.

In the first embodiment, the first of the distinctive physical motions involves the insertion of the fingers into the aperture in the housing 42 and a pushing motion to move the lever outwardly of the housing. The second motion requires a generally upward movement of the hand to move the lever toward the handle 26. In the second embodiment, the two motions are basically similar although the first simply involves movement of the member 146 so as to displace the lever from the housing 142.

In both cases, it is particularly noted that the means enabling the operator to move the lever out of the housing is restricted by a portion of the housing 42 and 142 which lies between the lever-receiving recesses 43 and 143 and the aperture 44 and slot 144, respectively. In each case, the housing portion so restricts the enabling means so that the operator cannot move the lever into the on position by use of the enabling means alone.

In the specific embodiments of this invention which have been illustrated, the switch and switch operating mechanism are illustrated as being nested within the curved portion of the bail handle 26 so that an operator using the mower by grasping the handle and pushing can conveniently retain the lever 38 against the bail handle when his hand is in the normal operating position. While the principles of the application can readily be adapted to other switch locations and other tool grips, in this particular application, it is desirable that the operator be able to easily hold the switch on without tightly grasping the lever 38 against the handle 26 at all times. Accordingly, in the configuration illustrated, it is preferred that the switch 32 be turned on at a point between the intermediate position illustrated in FIG. 4 and the fully rotated position illustrated in FIG. 5. The exact arc in any given instance depends, of course, on the exact configuration of the parts and the exact path of movement of the lever, but generally it should be such that the operator can relax his hand on the bail handle 26 without reaching the turn off point of the switch 32. It has been found that this objective can be achieved by positioning the switch so that, under the worst case manufacturing tolerance conditions, the switch is on throughout the last 20° of movement. The operator may accordingly use the device in a convenient manner without being required to tightly grasp the switch lever at all times.

While the foregoing illustration and description of this invention have been presented in terms of a cordless lawnmower, the operation of this mechanism should not be limited only to battery operated devices. If the additional safety factor provided by this mechanism is desired, it may also be used in the context of a corded electric lawnmower or other gardening device without essential modification.

In the foregoing description and illustration of this invention, two specific embodiments thereof have been disclosed in detail. Several changes and modifications will be apparent to those skilled in the art which do not depart from the essential concept of this invention and accordingly, it is intended that the appended claims cover all such changes and modifications as fall within the true spirit and scope of this invention.

I claim:

1. A switch-operating mechanism for an electric tool including a working output member, an electric motor for driving said output member, wire means for connecting said motor to a source of electric power for energization thereof, a switch for controlling the connection of said motor to said source, and a switch operating mechanism, said mechanism comprising a switch-operating lever movable between a first position wherein said switch is off and said motor is disconnected from said source, a second position wherein said switch is on and said motor is connected to said source, and a third position intermediate said first position and said second position wherein said switch is off; a housing having an aperture therein for receiving said lever in said first position, said aperture being shaped to substantially completely enclose said lever in a close fitting manner to prevent operator access thereto when said lever is in said first position; and means associated with said housing while being independent of said aperture and of said lever enabling an operator to move said lever from said first position into said third position.

2. A switch operating mechanism as claimed in claim 1 wherein a portion of said housing is positioned to restrict the extent of movement of said lever which can be caused by said enabling means, the amount of movement of said lever permitted by said restriction means being less than that required to move said lever into said second position.

3. A switch actuating mechanism as claimed in claim 1 wherein said enabling means comprises a lever-operating member having a first, finger engageable portion and a second, lever-engaging portion, said second portion being disposed within said housing and positioned to push said lever outwardly of said first aperture upon lateral movement of said finger-engageable portion.

4. A switch-operating mechanism for an electric tool including a working output member, an electric motor for driving said output member, wire means for connecting said motor to a source of electric power for energization thereof, a switch for controlling the connection of said motor to said source, and a switch operating mechanism, said mechanism comprising a switch-operating lever movable between a first position wherein said switch is off and said motor is disconnected from said source, a second position wherein said switch is on and said motor is connected to said source, and a third position intermediate said first position and said second position wherein said switch is off; a housing having an aperture therein for receiving said lever in said first position, said aperture being shaped to substantially completely enclose said lever; and means independent of said aperture enabling an operator to move said lever from said first position into said third position; said enabling means comprising a second aperture in said housing to enable said operator to push said lever out of said first aperture into said third position.

5. An electric motor-driven device of the type designed principally for outdoor use and including means to prevent inadvertent actuation, said device comprising a movable output member, a motor for driving said movable output member, means for connecting said motor to a source of power, a switch controlling said connecting means, and a switch actuating mechanism comprising a switch-actuating lever movable between a first position in which said switch is off, a second position in which said switch is off, and a third position in which said switch is on; a housing; an aperture in said housing for receiving said lever in said first position, said aperture having a shape corresponding to that of said lever to prevent direct access to said lever when said lever is in said first position; and means extending within said housing permitting access to a portion of said lever enclosed when said lever is in said first position to enable an operator to move said lever from said first position towards said second position; and biasing means normally urging said lever into said first position.

6. A device as claimed in claim 5 wherein a portion of said housing is positioned to restrict access by the operator to said lever by way of said enabling means so that the operator cannot move said lever from said first position to said third position by way of said enabling means.

7. A device as claimed in claim 6 wherein said enabling means comprises a lever-operating member extending through said housing from the base of said lever-receiving aperture to an external surface of said housing.

8. An electric motor-driven device of the type designed principally for outdoor use and including means to prevent inadvertent actuation, said device comprising a movable output member, a motor for driving said movable output member, means for connecting said motor to a source of power, a switch controlling said connecting means, and a switch actuating mechanism comprising a switch-actuating lever movable between a first position in which said switch is off, a second position in which said switch is off, and a third position in which said switch is on; a housing; an aperture in said housing for receiving said lever in said first position, said aperture having a shape corresponding to that of said lever to prevent direct access to said lever when said lever is in said first position; and means extending within said housing permitting access to a portion of said lever enclosed when said lever is in said first position to enable an operator to move said lever from said first position towards said second position; and biasing means normally urging said lever into said first position; a portion of said housing being positioned to restrict access by the operator to said lever by way of said enabling means so that the operator cannot move said lever from said first position to said third position by way of said enabling means; said enabling means comprising an access aperture extending through said housing between the bottom of said lever-receiving aperture and another surface of said housing.

9. A cordless electric lawn mower comprising a movable blade, a motor for driving said movable blade, a battery for enabling energization of said motor, a switch controlling the connection of said battery to said motor, a switch-actuating mechanism for limiting the possibility of accidental energization of said blade, a handle for engagement by an operator; said switch operating mechanism comprising a housing mounted on said handle; means for mounting said switch within said housing; a switch-actuating lever; a grip surface on said handle; said lever being configured to be retained against said grip surface during use of said device by an operator; said lever being biased away from said grip surface toward an intermediate position wherein said switch is off and said lever is disposed externally of said housing, and toward a safety position wherein said switch is off and said lever is located entirely within said housing; said housing being shaped to receive said lever in a close fitting manner to prevent operator access thereto when said lever is in said safety position; and independent means extending through said housing for enabling an operator to move said lever only from said safety position to said intermediate position.

10. A lawn mower as claimed in claim 9 and including means pivotally mounting said lever at one end thereof, and wherein said switch is on when said lever is moved, in its path of movement, to within 20° of said grip surface.

11. A lawn mower as claimed in claim 9 wherein said switch is actuated by said lever only after said lever is moved out of said housing and through said intermediate position.

12. A lawn mower as claimed in claim 9 and including means pivotally mounting said lever at one end thereof to define an arcuate path of movement of said lever, and said lever including a switch-actuating portion; said portion being positioned to engage said switch only after said lever is moved through said intermediate position to a location within comfortable gripping distance of said grip surface.

* * * * *